March 24, 1931.  H. A. GREENWALD  1,797,954
REFRIGERANT CONTROL
Filed April 22, 1929

INVENTOR
Harold A. Greenwald
BY Whittemore Hulbert
Whittemore & Belknap
ATTORNEYS Patented Mar. 24, 1931

1,797,954

UNITED STATES PATENT OFFICE

HAROLD A. GREENWALD, OF DETROIT, MICHIGAN, ASSIGNOR TO THOMAS C. WHITEHEAD, OF DETROIT, MICHIGAN

REFRIGERANT CONTROL

Application filed April 22, 1929. Serial No. 357,151.

This invention relates generally to refrigerating apparatus and refers more particularly to a simplified and improved means for controlling the supply of refrigerant from the condensing means to the cooling means of such apparatus.

Usually the supply of refrigerant from the condensing means to the cooling means is regulated by a float chamber or capillary tube. However, in use dirt and sediment finds its way into the float chamber, particularly the valve mechanism thereof, or into the capillary tubes, whichever are used, and affects the efficiency and operation thereof. In some instances filters have been used in combination with the float chambers or capillary tubes to insure proper operation thereof, but such additional parts add to the cost of manufacture and installing such apparatus.

Therefore, it is the object of the present invention to substitute or replace the float valve and filter combination or filter and capillary tube combination with a single means that is capable of serving as a filter and of giving equivalent resistance, for instance, to that of a capillary tube or float chamber, to control the supply of refrigerant from the condensing means to the cooling means of the apparatus.

Figure 1:
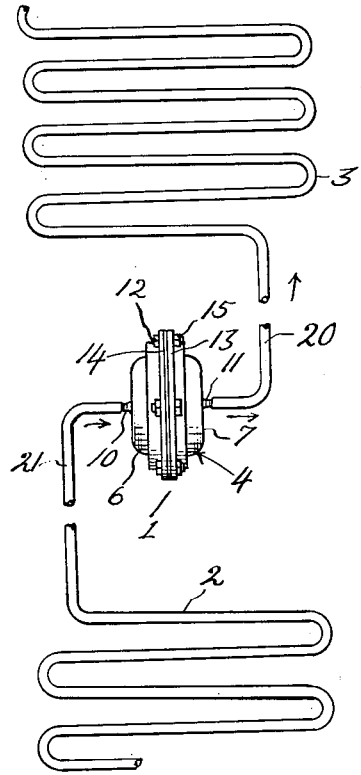
Figure 1 is a diagrammatic view of a portion of a refrigerating apparatus and showing a fluid resistance unit embodying my invention between the condensing and cooling means thereof.
Figure 2:
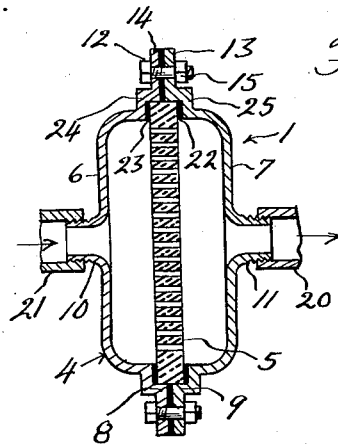
Figure 2 is an enlarged vertical sectional view through the resistance unit.
Figure 4:
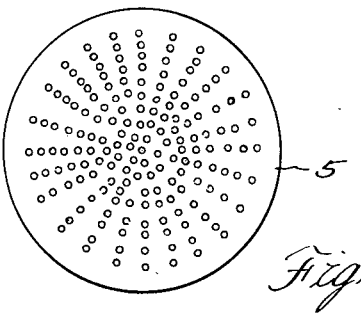
Figure 4 is a detail view of the porous plug.
Figure 3:
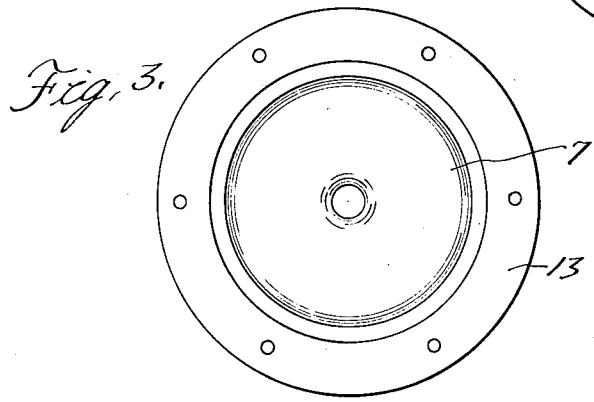
Figure 3 is a detail view of one of the casing sections.

Referring now to the drawings, 1 is the means embodying my invention for filtering and controlling the supply of refrigerant from a condensing means such as 2 to a cooling means such as 3 of a suitable refrigerating apparatus. As shown, this means 1 comprises a sectional casing 4 and a porous plug 5. Preferably the sections 6 and 7 of the casing are dished, open toward each other, have stepped laterally extending marginal flanges 8 and 9 respectively, and have tubes 10 and 11 respectively projecting laterally from the bases of the dished portions, preferably at the centers thereof. Any suitable material may be used in the construction of these sections 6 and 7 and any suitable means, such as the bolts 12 extending through the outer steps 13 and 14 of the flanges 8 and 9, and the nuts 15 may be used as securing means for said sections. The tubes 10 and 11 constitute inlet and outlet means for the casing and may be connected in any suitable manner to the sections 20 and 21 of the conduit connecting the condensing and cooling means of the apparatus.

The plug 5 is preferably flat like a disk and is held between suitable gaskets 22 and 23 in the inner stepped portions 24 and 25 respectively of the casing sections. Preferably this plug constitutes a partition for the casing between the sections 6 and 7 thereof, is formed of a porous ceramic substance such as unglazed porcelain of the proper texture, and acts as a fluid resistance until that reduces the pressure of the refrigerant between the high and low sides of the apparatus.

In practice, the material of this plug or the kind of material used may be so proportioned, and the diameter and thickness thereof may be so proportioned that it will give the equivalent resistance, for instance, to that of a capillary tube or float chamber and control the supply of the refrigerant from the condensing means to the cooling means. Due to this construction the plug also acts as a filter but, of course, changes its resistance the same as any other filter as sediment or dirt accumulates thereon.

With the above and other objects in view the invention consists of certain novel features of construction, combinations and arrangements of parts that will be hereinafter more fully described and particularly pointed out in the appended claims.

What I claim as my invention is:

1. The combination with the condensing and cooling means of a refrigerating apparatus, of means capable of serving as a filter and of resisting the flow of refrigerant so as to control the supply of refrigerant from the condensing means to the cooling means aforesaid, said means including a vertically arranged porous plug and a sectional casing therefor, the sections of the casing being dished, arranged substantially vertically, opening toward each other, having vertically extending marginal flanges, and having laterally projecting horizontal tubular portions at approximately the centers thereof, the plug being a plate-like disk of ceramic substance constituting a vertical partition for the casing and having the edge portions thereof received between the marginal flanges aforesaid, and the tubular portions constituting an inlet and an outlet respectively for the casing at opposite sides thereof and being in substantially horizontal alignment with the center of the plug whereby reservoirs are provided upon opposite sides of the plug at the bottom of the casing in each section thereof, one of said reservoirs being adapted to receive sediment gravitating from one of the tubular portions aforesaid.

2. The combination with the condensing and cooling means of a refrigerating apparatus, of means capable of serving as a filter and of resisting the flow of refrigerant so as to control the supply of refrigerant from the condensing means to the cooling means aforesaid, said means including a vertically arranged porous plug and an upright sectional casing therefor having the sections thereof crimped against opposite upright faces of the plug and provided at the centers thereof with substantially horizontal aligned inlet and outlet ports, said ports being in substantial alignment with the center of the plug whereby reservoirs are provided upon opposite sides of the plug at the bottom of the casing in each section thereof, one of said reservoirs being adapted to receive sediment gravitating from one of the ports aforesaid.

In testimony whereof I affix my signature.

HAROLD A. GREENWALD.